United States Patent [19]

Perreault et al.

[11] 4,082,346
[45] Apr. 4, 1978

[54] VEHICLE WINDSHIELD

[75] Inventors: Jules Perreault; Emile Bombardier, both of Valcourt, Canada

[73] Assignee: Bombardier Limited, Valcourt, Canada

[21] Appl. No.: 709,095

[22] Filed: Jul. 27, 1976

[30] Foreign Application Priority Data

Oct. 3, 1975 Canada .................................. 237028

[51] Int. Cl.² ............................................. B60J 1/02
[52] U.S. Cl. ................................................ 296/84 R
[58] Field of Search ................ 296/84 R, 90, 91, 78.1

[56] References Cited

U.S. PATENT DOCUMENTS

| 3,311,406 | 3/1967 | Fritsch | 296/91 |
| 3,993,347 | 11/1976 | Bombardier | 296/84 R |

Primary Examiner—Philip Goodman
Attorney, Agent, or Firm—Larson, Taylor and Hinds

[57] ABSTRACT

A vehicle windshield, for example for a snowmobile, comprises a contoured sheet of transparent plastics material having upper and lateral edges strengthened by the marginal areas thereof being sharply curved in the forward direction. Thus the edge of the windshield presented toward the vehicle operator is smoothly rounded and is less likely to cause injury.

3 Claims, 2 Drawing Figures

VEHICLE WINDSHIELD

FIELD OF THE INVENTION

This invention relates to a new or improved windshield for a vehicle, particularly, although not exclusively, a snowmobile windshield.

DESCRIPTION OF THE PRIOR ART

Conventionally, a windshield for a vehicle such as a snowmobile or motorcycle is attached at its lower edge to the vehicle, the upper and lateral edges of the windshield being encased in a smoothly contoured length of metal trim, which besides enclosing any sharp edges which may be present on the periphery of the windshield, strengthens and stiffens the edges of the windshield against air-induced loadings which arise when the vehicle is driven at high speeds.

SUMMARY OF THE INVENTION

According to the present invention, there is provided a vehicle windshield comprising a contoured sheet of transparent plastics material having a lower edge adapted for attachment to the vehicle, and upper and lateral edge regions at least a portion of which includes integral stiffening means comprising a marginal edge area of said windshield which is sharply curved transversely to the length of the edge regions.

The windshield may be formed from a sheet of polycarbonate material, convexly curved in the conventional manner both in the transverse and vertical directions on its front side, the marginal edge area preferably extending for the full length of the upper and lateral edge regions of the windshield, and being curved rearwardly with respect to the intended direction of travel of the vehicle. The marginal edge is preferably curved through an angle in excess of 90° with respect to the plane of the adjacent portion of the windshield, and may indeed be fully curved to form a substantially closed tubular channel along the edges of the windshield.

Preferred embodiments of the windshield according to the invention offer a number of advantages over conventional windshields embodying metal edging trim. Among these are (1) improved impact protection for the driver, (2) reduced cost, (3) reduced likelihood of loss of protection as can occur with a conventional windshield with metal trim where the latter has been removed or becomes dislodged on impact, (4) enhanced stiffness of the windshield which permits the windshield to be fabricated in material of reduced thickness, thus providing additional cost saving.

BRIEF DESCRIPTION OF THE DRAWINGS

The invention will further be described, by way of example only, with reference to the accompanying drawings wherein.

DESCRIPTION OF THE PREFERRED EMBODIMENT

Figure 1:
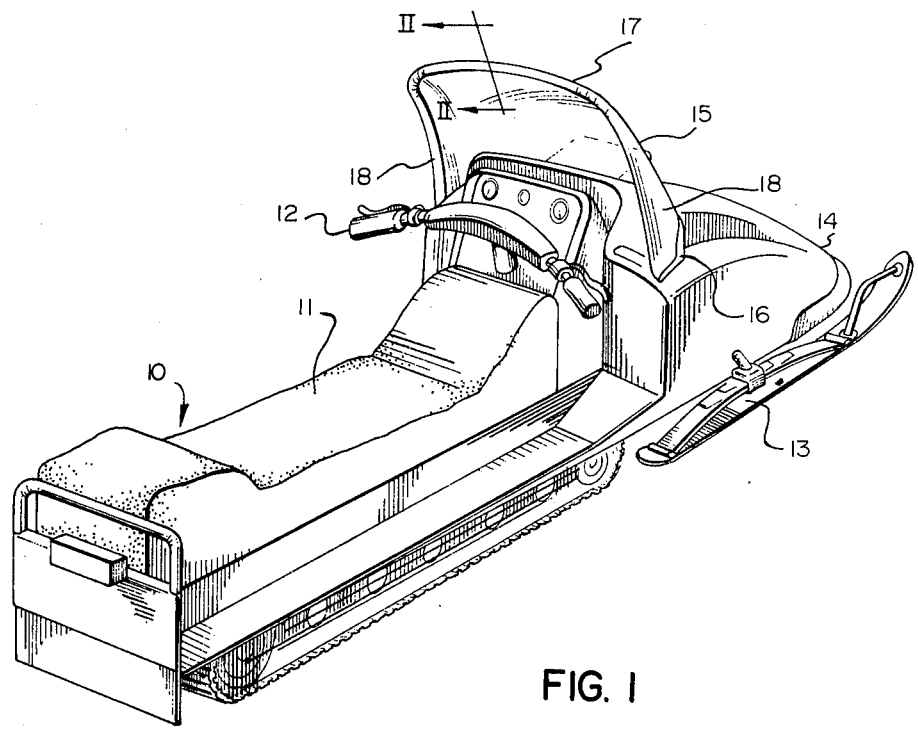
FIG. 1 is a perspective view of a snowmobile provided with an improved windshield in accordance with the invention.

Referring to FIG. 1, a snowmobile 10 has a seat 11 arranged to be straddled by a driver, and at the forward end of the seat handle bars 12 which control the steering action of the pair of skis 13 arranged at the front of the snowmobile beneath the cab 14.

Figure 2:
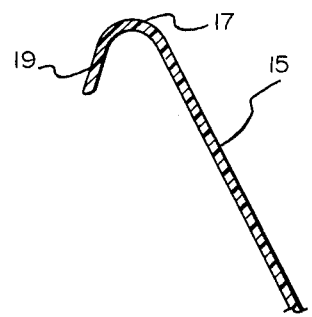
FIG. 2 is a fragmentary sectional view to a larger scale taken on the line II—II in FIG. 1.

At the rear upper edge of the cab 14, is an upwardly and rearwardly extending windshield 15 fabricated in transparent polycarbonate material, and having a lower edge 16 fixed to the cab in any suitable manner, for example, as disclosed in co-pending United States application Ser. No. 560,796, Bombardier, filed Mar. 21st, 1975, and assigned to the same assignee as the present application. As illustrated, the windshield 15 extends upwardly at a rearward inclination, and its front surface is convexly curved both in the transverse and the vertical direction. The windshield is formed from a polycarbonate sheet of uniform thickness, and includes integral stiffening means at its top and lateral edges 17 and 18 respectively. As illustrated in FIG. 2, the stiffening means comprises a rolled over marginal area 19 which is rearwardly curved with respect to the plane of the adjacent portion of the windshield, and extends around the entire lateral and top edges of the windshield. As shown in FIG. 2, the edges of the windshield are thus smoothly curved, the marginal edge areas 19 lying at an angle of approximately 135° with respect to the front surface of the windshield.

With this arrangement, the windshield is strengthened against wind-induced loadings, and provides the desired degree of impact protection for the driver. The above described windshield can be fabricated from a polycarbonate sheet having a thickness of 0.040 inches, as compared to a thickness of 0.060 inches for a windshield provided with standard metal edging trim.

The actual form of the curved marginal edge 19 is not critical, so long as it provides the desired impact protection and added strength. If desired, the edge 19 could be bent closer to the rear surface of the windshield to form a substantially closed tubular channel around the top and lateral edges of the latter.

What is claimed as our invention is:

1. A vehicle windshield comprising: a unitary contoured sheet of transparent plastics material having an upwardly and rearwardly directed central section the lateral sides of which merge into rearwardly extending side sections, the lower margin of said sheet being adapted for attachment to the vehicle, the upper edge of the central section and the rear edge of each side section being reinforced solely by a marginal area extending along said edges being sharply curved rearwardly transversely to the length of said edges through an angle of curvature in excess of 90°, to provide an integral stiffening means on the windshield.

2. A windshield according to claim 1 adapted for attachment to the vehicle solely at said lower margin, said central section of the windshield being convexly curved in the transverse and vertical directions, and said sharply curved marginal area extending throughout substantially the entire lengths of said upper edge and said rear edges.

3. A windshield according to claim 1, fabricated in polycarbonate material.

* * * * *